Figures 1, 2, 3:
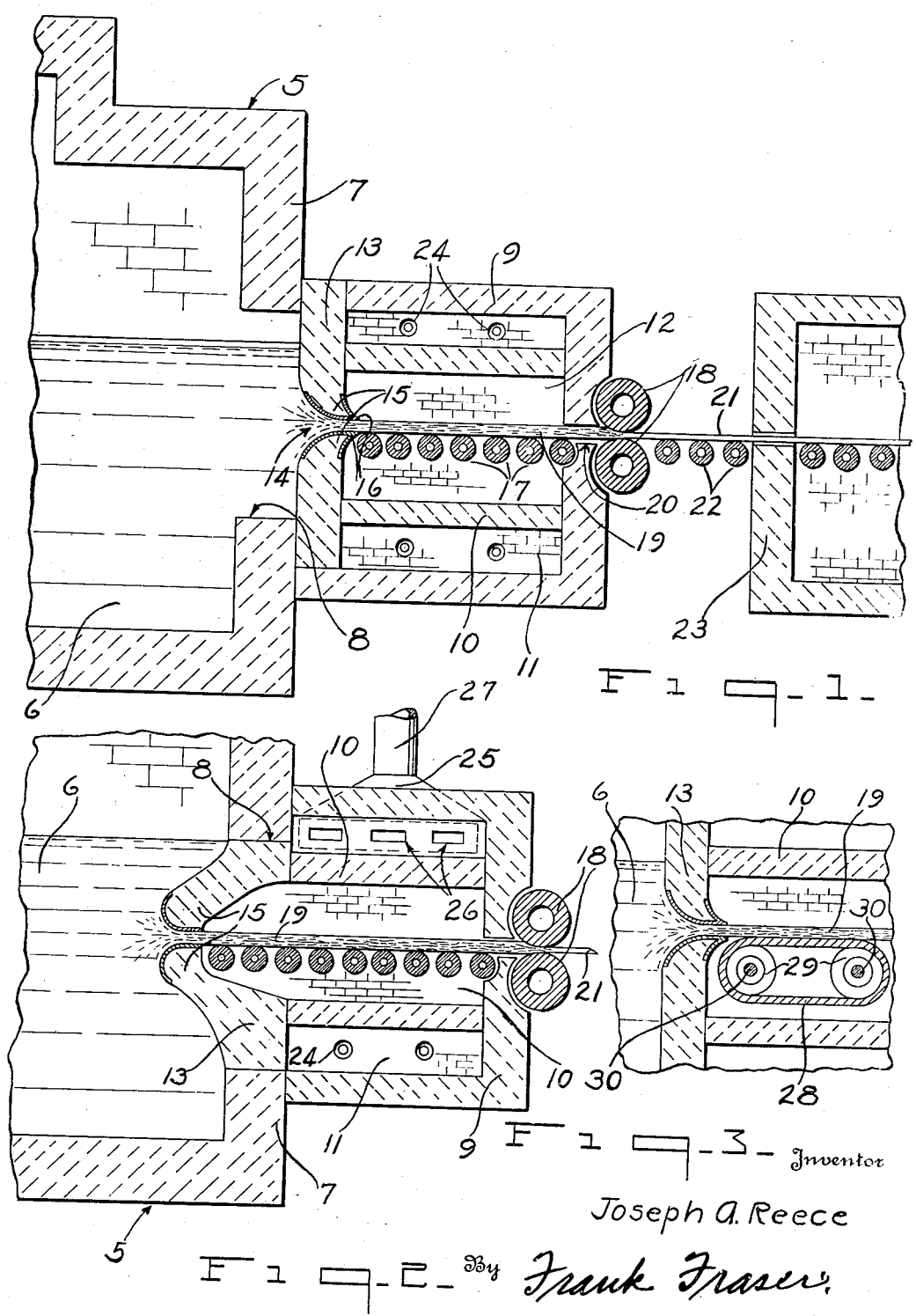

July 21, 1931.  J. A. REECE  1,815,726
METHOD AND APPARATUS FOR PRODUCING SHEET GLASS
Filed Nov. 15, 1926

Inventor
Joseph A. Reece
By Frank Fraser,
Attorney

Patented July 21, 1931

1,815,726

UNITED STATES PATENT OFFICE

JOSEPH A. REECE, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR PRODUCING SHEET GLASS

Application filed November 15, 1926. Serial No. 148,448.

This invention is an improvement in the art of producing sheet glass, and has more particular reference to a method and apparatus for forming a continuous sheet.

An important object of the invention is to provide, in the art of producing sheet glass, means for conditioning the temperature of a continuously moving stream of molten glass before reducing it to sheet form.

Another object of the invention is to provide, in the art of producing sheet glass, means for uniformly controlling the temperature of a stream of molten glass formed under pressure, and means for reducing said stream to sheet form.

A further object of the invention is to provide, in the art of producing sheet glass, means for causing a continuously moving sheet of molten glass to be of a substantially uniform temperature throughout its entire area at the beginning of the annealing operation.

A further object of the invention is to provide, in the art of producing sheet glass, means for reducing a continuously moving stream of molten glass to sheet form, means for annealing said sheet, and means for conditioning the temperature of the stream of molten glass before it is reduced to sheet form in order that the resultant sheet will be of a substantially uniform temperature throughout its entire area at the beginning of the annealing operation.

Still another and important object of the invention is to provide, in the art of producing sheet glass, the method of forming a sheet which consists in conditioning the temperature of a continuously moving stream of molten glass formed under pressure, reducing said stream to sheet form, and subsequently annealing said sheet.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through improved sheet glass apparatus constructed in accordance with the present invention, and Figs. 2 and 3 illustrate slightly modified forms of the present invention.

Referring now more in detail to the accompanying drawings, and more especially to Fig. 1, the numeral 5 designates the exit end of a glass melting furnace of any desired construction, and within which the glass batch containing the ingredients from which the molten glass is produced is melted to form the mass of molten glass 6. The end wall 7 of the tank is provided with a relatively large outlet opening 8, and positioned in advance of the said opening is a housing 9. Arranged within the housing 9 is a horizontal annular or rectangular partition wall 10 which divides the interior thereof into a heating chamber 11 and a somewhat larger conditioning chamber 12.

Positioned between the housing 9 and the tank 5, and closing a greater portion of the opening 8, is a refractory member 13 provided with a horizontal slot 14 defined by a pair of spaced lips 15. These lips are directed outwardly as shown, and are provided with metallic caps 16 formed of a suitable noncorrosive alloy and which caps function to prevent wearing away of the said lips 15. Arranged within the conditioning chamber 12 is a plurality of spaced horizontally aligned supporting rollers 17, while arranged in advance of the said housings are the spaced sheet forming rolls 18.

A continuously moving stream of molten glass 19 is adapted to flow from a tank 5 through the slot 14, into and through the conditioning chamber 12. This stream is supported within the said chamber upon the horizontally aligned rollers 17, and as it issues from the said chamber through a slot 20 in the outer end wall thereof, it is passed between the rolls 18 which serve to reduce the said stream to sheet form as indicated at 21. This sheet 21 is then carried along upon a plurality of rollers 22 into an annealing leer 23 where the said sheet is gradually reduced to room temperature as is well known in the art. As shown, the stream 20 is formed of subsurface glass only and this glass is continuously forced through the slot 14 by the head pressure of the molten glass 6 within the tank 5.

Arranged within the heating chamber 11 are any preferred number of suitable gas burners or the like 24, and the gas issuing from these burners serves to heat the partition wall 10. This heat radiated through the wall 10 into the conditioning chamber 12 is distributed evenly onto the stream of molten glass 19. With such an arrangement, the stream of molten glass 19 will be so conditioned that it will be of a substantially uniform temperature throughout its entire area as it passes to the sheet forming rolls 18, and consequently the sheet 21 will also be of substantially a uniform temperature throughout its entire area as it enters the annealing leer. Thus, undesirable strains in the glass as it passes through the said leer will be reduced to a minimum and obviously, better annealing of the sheet can be obtained when the temperature thereof is substantially uniform than when the area of said sheet is at different temperatures. The present invention therefore embodies means for forming a stream of molten glass under head pressure, means for uniformly controlling the temperature thereof and means for reducing said stream to sheet form.

In Fig. 2, wherein has been shown a slightly modified form of the present invention, the lips 15, instead of being directed outwardly are directed inwardly into the molten glass 6 so that the sub-surface glass is received somewhat back into the tank instead of at the end thereof. As shown, the refractory member 13 is arranged within the openings 8 instead of in advance thereof as illustrated in Fig. 1. Again, in this form of the invention, there is arranged within the heating chamber 11 a member 25 provided with a plurality of outlet openings 26 and with a stack 27 for drawing the waste products of combustion exteriorly of the said heating chamber.

In the form of the invention shown in Fig. 3, the stream of molten glass, instead of being supported upon a plurality of horizontally aligned rollers, is supported upon and carried along by means of an endless conveyor 28 trained about rolls 29 carried by shafts 30.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:
1. In sheet glass apparatus, a tank containing a mass of molten glass and having an end wall, a member arranged within said wall and projecting rearwardly within the tank and having a slot therein beneath the level of said molten glass, a housing mounted in opposition to said member, a partition wall within the housing dividing the interior thereof into a heating chamber and a somewhat larger conditioning chamber, rotatable means within the conditioning chamber for receiving a stream of molten glass issuing from said slot and carrying it through said chamber in a generally horizontal direction, means for heating the heating chamber, and a pair of forming rolls for receiving the stream of molten glass and reducing it to a sheet of substantially predetermined and uniform thickness.

2. In sheet glass apparatus, a tank containing a mass of molten glass and having an end wall, a member arranged within said wall and projecting rearwardly within the tank and having a slot therein beneath the level of said molten glass, a housing mounted in opposition to said member and divided interiorly into a conditioning chamber and a surrounding heating chamber, movable means within the conditioning chamber for receiving a stream of molten glass issuing from said slot and carrying it through said chamber in a generally horizontal direction, means for heating the heating chamber, and means for receiving the stream of molten glass and reducing it to a sheet of substantially predetermined and uniform thickness.

3. In sheet glass apparatus, a tank containing a mass of molten glass and provided with an end wall having a slot therein, said slot being positioned inwardly of the end of the tank, and beneath the level of the molten glass, a housing mounted in opposition to said slot and divided interiorly into a conditioning chamber and a surrounding heating chamber, movable means within the conditioning chamber for receiving the stream of molten glass issuing from said slot and carrying it through said chamber in a generally horizontal direction, means for heating the heating chamber, and means for receiving the stream of molten glass as it leaves the conditioning chamber and reducing it to a sheet of substantially predetermined and uniform thickness.

Signed at Toledo, in the county of Lucas and State of Ohio, this 12th day of November, 1926.

JOSEPH A. REECE.